April 16, 1935.  A. S. HOBERG ET AL  1,997,791
HOPPER DISCHARGE MECHANISM
Filed Sept. 14, 1933
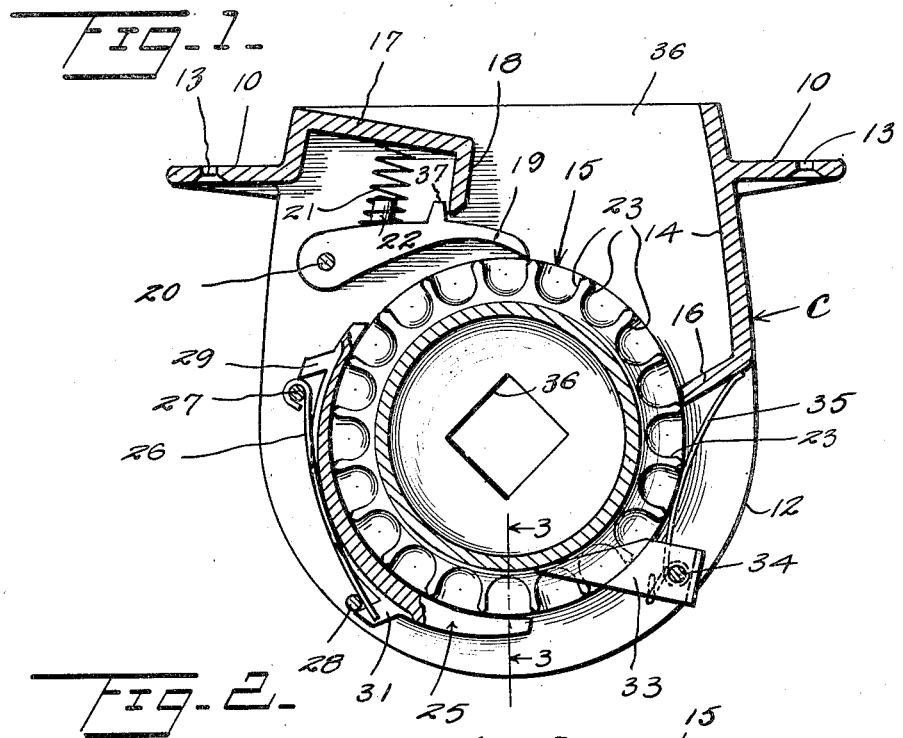
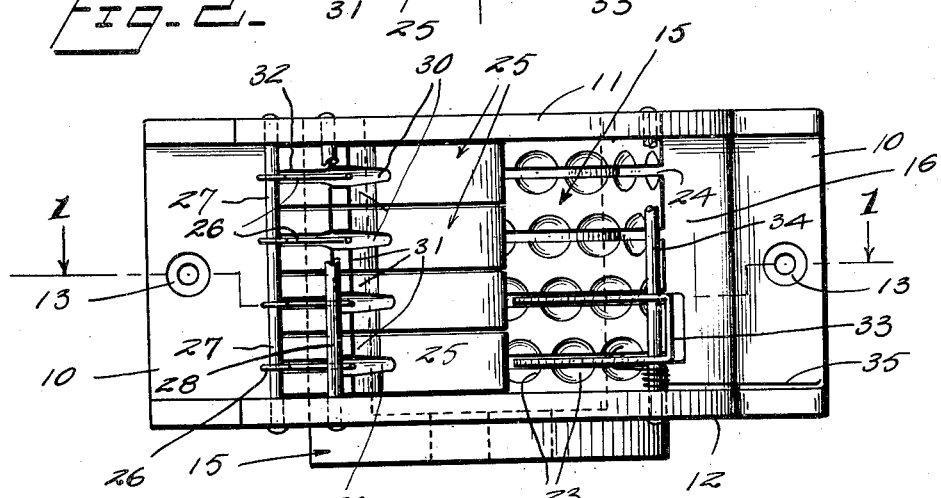
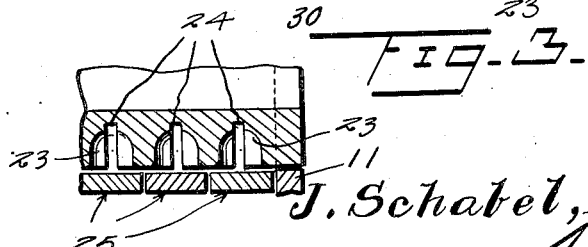
Inventors
A. S. Hoberg
J. Schabel, E. C. Schwantes
By Watson E. Coleman
Attorney

Patented Apr. 16, 1935

1,997,791

UNITED STATES PATENT OFFICE 1,997,791

HOPPER DISCHARGE MECHANISM

Arthur S. Hoberg, Horicon, Joseph Schabel, Mayville, and Edwin C. Schwantes, Horicon, Wis.

Application September 14, 1933, Serial No. 689,464

5 Claims. (Cl. 221—125)

This invention relates to seed planters and more particularly to a hopper discharge mechanism for use in connection with planting devices.

An object of this invention is to provide an improved discharge mechanism which is so constructed as to permit the discharge of the desired quantity of seeds.

Another object of this invention is to provide a discharge mechanism of this kind which is so constructed as to permit the reception of different sizes of seeds without injury thereto and also includes means whereby the seeds are positively removed from the discharging drum.

A further object of this invention is to provide a device for planting seed in rows from one-half to two and one-half inches apart depending on the gearing of the planting machine.

The above and various other objects and advantages of this invention will in part be described and in part be understood from the following detailed description of the present preferred embodiment, the same being illustrated in the accompanying drawing wherein:—

Figure 1 is a vertical section taken substantially along the line 1—1 of Figure 2 of a device constructed according to the preferred embodiment of this invention.

Figure 2 is a bottom plan view of the device.

Figure 3 is a fragmentary sectional view taken substantially on the line 3—3 of Figure 1.

Referring to the drawing wherein like characters of reference designate corresponding parts throughout the views, the letter C designates generally a cup or casing provided adjacent the upper end thereof with an outstanding flange 10 provided with apertures 13 so as to permit the mounting of the cup C on the bottom of a hopper of desired construction.

The cup C comprises side walls 11 and 12 and a rear wall 14. The cup C at the front lower side thereof is open and a discharging drum 15 is rotatable in the cup C within this open front side. The rear wall 14 is provided with a forwardly disposed extension 16 terminating adjacent the periphery of the drum 15 so as to prevent seeds or the like from passing rearwardly about this drum 15. The top portion of the cup C is provided with an inclined plate 17 terminating in a downwardly extending flange 18 disposed in spaced relation to the periphery of the drum 15. A plurality of dogs 19, which are rockably mounted on a shaft 20 extending between the side walls 11 and 12, have their free or forward ends contacting with the periphery of the drum 15.

Springs 21 engage about pins or lugs 22 integral with the dogs 20 and engage the under surface of the plate 17 so as to constantly urge the dogs 19 into contact with the periphery of the drum 15 and permit the dogs 19 to rise slightly in the event seeds of relatively large size drop into the pockets 23, which are provided in the surface of the drum 15. The drum 15 has a number of rows of these pockets 23 and passing through substantially the center of the pockets 23 of each series is a peripheral slot 24, the purpose for which will be hereinafter described.

A plurality of segmental members 25 are disposed on the front side of the drum 15 and are constantly urged into engagement with the periphery of the drum by means of springs 26, which are mounted on pins or bars 27 and 28. The segmental wall members 25 are provided with spaced lugs 29, the uppermost of which engages the upper bar 27 and the lowermost of which engages beneath the lower bar 28. In this manner, the segmental wall members 25 are held against circumferential movement while the springs 26 yieldably hold the wall members 25 against the periphery of the drum 15.

The lugs 29 are provided with grooves 30, and the wall members 25 intermediate the upper and lower lugs 29 and 31, respectively, are provided with a groove 32 within which the spring 26 engages.

In order to provide a means for ejecting the seeds disposed in the pockets 23, we have provided a plurality of ejecting fingers 33 which, in the present instance, are constructed in pairs, which are mounted on a bar 34 extending between the side walls 11 and 12, and a spring 35 engages each pair of fingers 33, so as to constantly urge these fingers into the bottom of the peripheral grooves 24. These fingers 33 are tapering and are disposed in the direction of the lower ends of the wall members 25. The drum 15, in the present instance, is hollow and is provided with a square or angular opening 36 for mounting the drum 15 on a drive shaft of angular construction.

In the use and operation of this discharge mechanism, the pockets 15, in the present instance, are constructed in a manner to receive pea seeds or seeds of an equivalent size but we, of course, do not wish to be limited to this particular type of seed pocket construction, as these pockets may be constructed of different sizes. The cup C is mounted in a vertical position, as shown in Figure 1, with the open intake end 36 uppermost. The drum 15 is rotated in the direction of the dogs 19 so that these dogs 19 will act to prevent the deposit of more than one seed in each pocket 23. The segmental wall members 25 will prevent the dropping out of the seeds after the drum passes beyond the dogs 19, and when each seed arrives at the lower end of the wall members 25, the ejecting fingers 33, which are loosely disposed in the annular grooves 24, will eject the seeds which may thereafter drop into suitable guide means to guide the seeds into the furrows in the ground.

The dogs 19 have a shoulder 37 on their upper sides outwardly of the wall 18 which acts as an abutment to prevent seeds from passing between the wall 18 and the dogs 19 and to prevent crushing of seeds at this point. The under side of the dogs 19 is so constructed that in the event large seeds enter the pockets 23, the forward end of each dog will ride over the large seed in one pocket and the dog will pass over the large seed and contact with the periphery of the drum 15 before the succeeding pocket passes the forward end of the dog.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A seed discharge means, comprising a cup, a drum rotatable in the cup and having a series of circumferentially arranged seed pockets, a pair of spaced bars secured to the cup and disposed in parallel relation to each other and to the longitudinal axis of the drum, a segmental member for each series of pockets, said segmental members being disposed between said bars and the periphery of said drum, spaced lugs carried by said members for holding said members against rotary movement while permitting lateral movement of the members relative to the drum, and yieldable means engaging said bars and said members to yieldably hold said members in contacting relation with said drum.

2. In a seed discharging means including a housing having an intake and an outlet and an opening in a wall thereof intermediate said intake and outlet, a recessed drum rotatably supported in said housing, a segmental plate closing said opening and contacting on its concave side with the periphery of the drum, a pair of outwardly extending lugs carried by the plate on the convex side thereof and disposed in spaced relation to each other, means carried by the casing and engaging between said lugs to hold the plate against circumferential movement relative to the drum while permitting lateral movement of the plate relative to the drum, and yieldable means constantly urging said plate in the direction of said drum.

3. In a seed discharging means including a housing having intake and outlet ports and an opening in a wall thereof intermediate said ports and a drum having peripheral pockets; a segmental member disposed in the opening of the housing and contacting on its concave side with the periphery of the drum, a pair of spaced lugs extending outwardly of the convex side of the segmental member, a pair of substantially parallel bars secured to the housing in spaced relation to each other there being one bar adjacent each lug whereby to hold the segmental member against rotary movement relative to the drum, and yieldable means for holding the member in contacting relation with the periphery of the drum.

4. In a seed discharging means including a housing having an intake port and an outlet port and an opening in a wall thereof intermediate said ports, a recessed drum rotatably supported in the housing, a segmental plate closing said opening and contacting on its concave side with the periphery of the drum, a pair of outwardly extending lugs carried by the plate on the convex side thereof and disposed in spaced relation to each other, means carried by the housing and engaging the confronting edges of the lugs to hold said plate against rotary movement relative to the drum while permitting lateral movement of the plate relative to the drum, and means constantly urging said plate in the direction of said drum.

5. In a seed discharging means including a housing having an intake and an outlet and an opening in a wall thereof intermediate said intake and outlet, a recessed drum rotatably supported in said housing, a segmental plate closing said opening and contacting on its concave side with the periphery of the drum, a pair of outwardly extending lugs carried by the plate on the convex side thereof and disposed in spaced relation to each other, means carried by the casing and engaging between said lugs to hold the plate against circumferential movement relative to the drum while permitting lateral movement of the plate relative to the drum, and yieldable means engaging the plate intermediate said lugs for constantly urging said plate in the direction of the drum.

ARTHUR S. HOBERG.
JOSEPH SCHABEL.
EDWIN C. SCHWANTES.